April 23, 1940.   G. B. SCHEIBELL   2,198,417
CAMERA CONSTRUCTION
Original Filed April 18, 1935    2 Sheets-Sheet 1
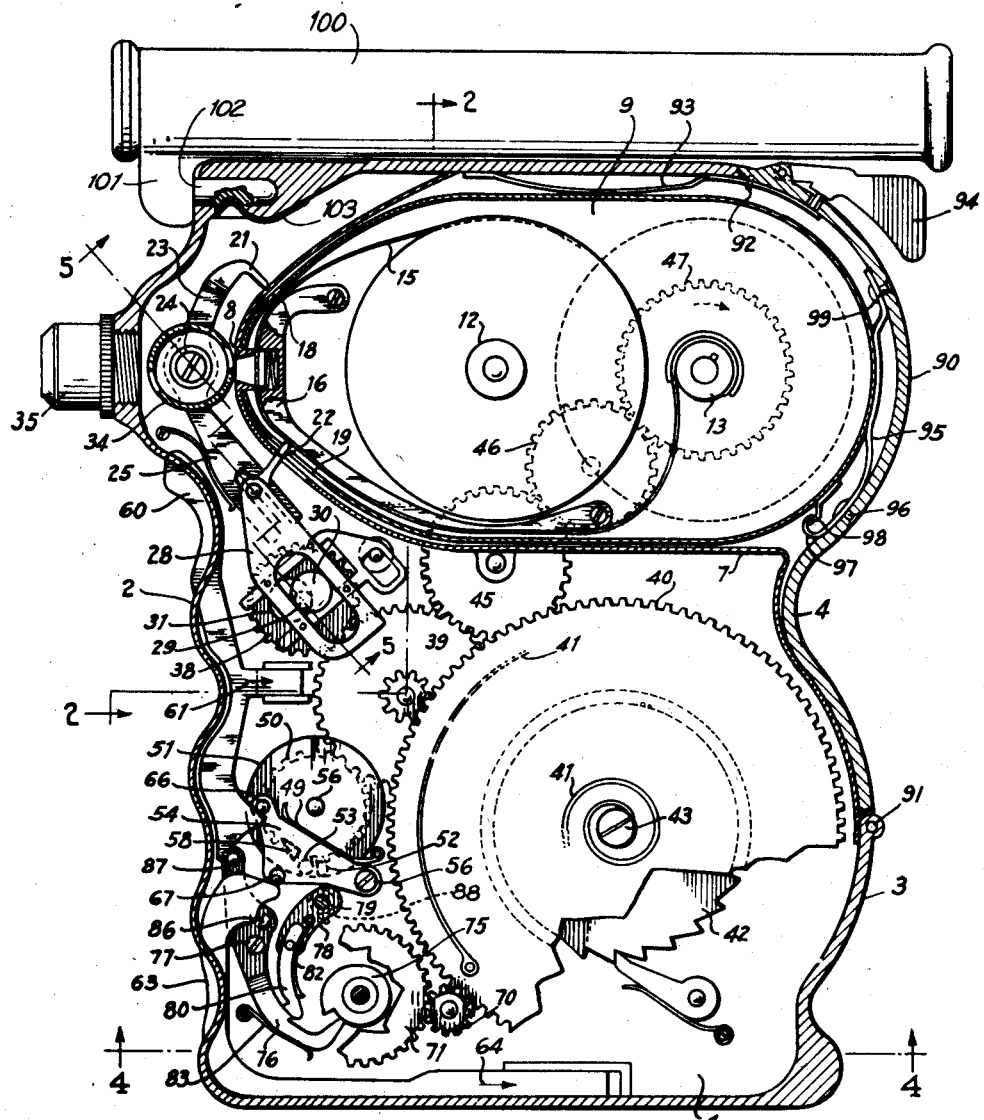
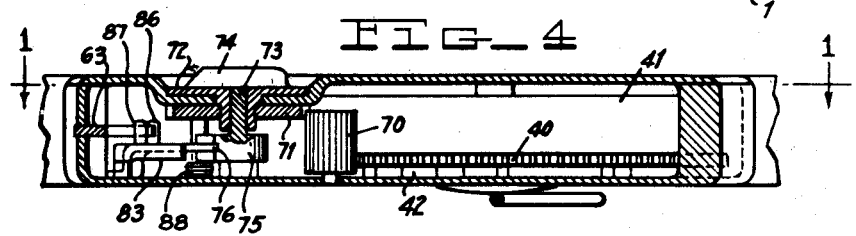
INVENTOR
Gordon Brown Scheibell
BY
John B. Brady
ATTORNEY.

April 23, 1940.  G. B. SCHEIBELL  2,198,417
CAMERA CONSTRUCTION
Original Filed April 18, 1935  2 Sheets-Sheet 2
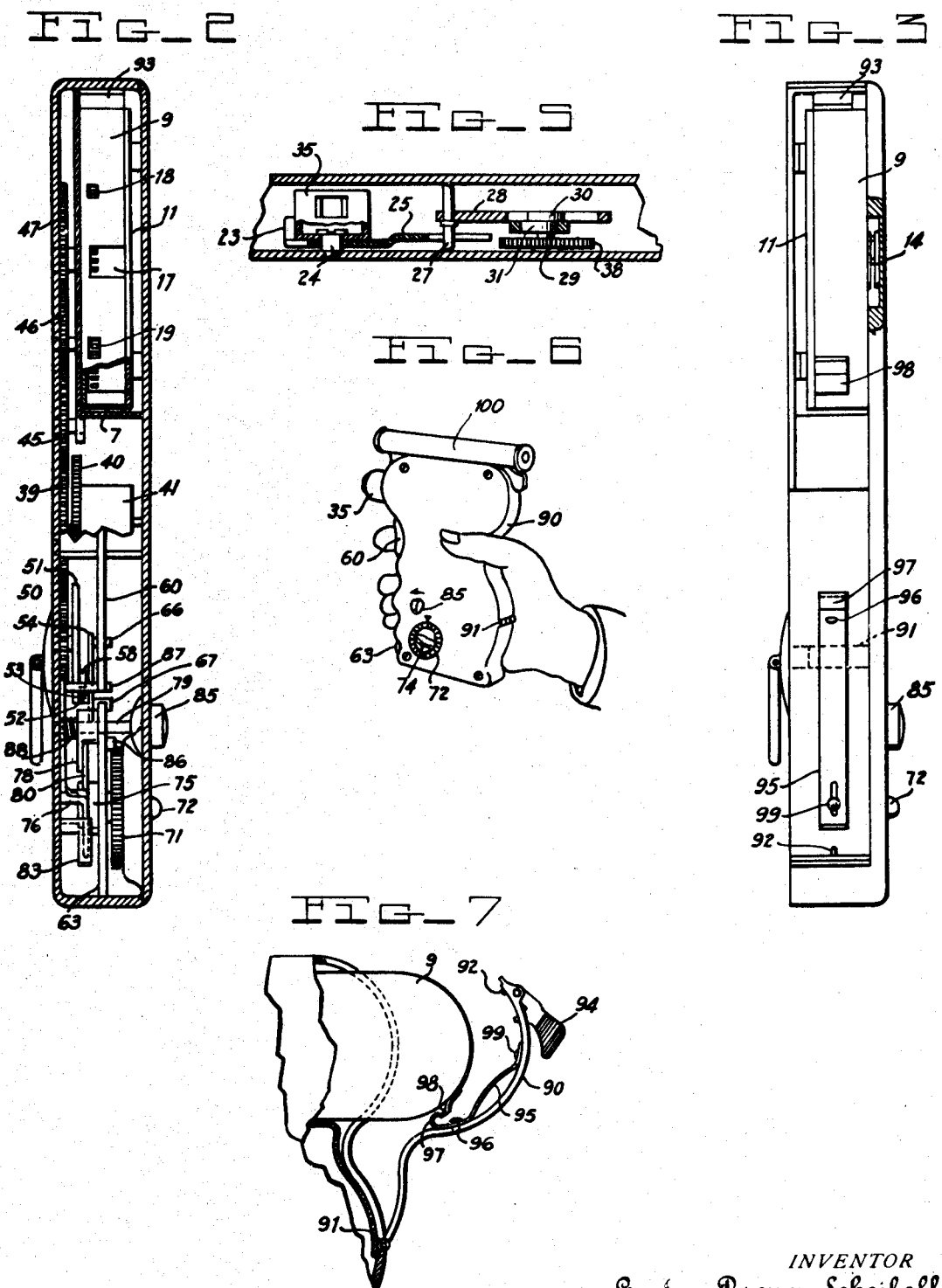
INVENTOR
Gordon Brown Scheibell
BY John B. Brady
ATTORNEY.

Patented Apr. 23, 1940

2,198,417

UNITED STATES PATENT OFFICE 2,198,417

CAMERA CONSTRUCTION

Gordon Brown Scheibell, Millburn, N. J.; William O. Scheibell, administrator of said Gordon Brown Scheibell, deceased Original application April 18, 1935, Serial No. 16,955. Divided and this application November 4, 1937, Serial No. 172,782

8 Claims. (Cl. 88—16)

My invention relates broadly to film apparatus and more particularly to a construction of apparatus for feeding and exposing a film, this being a division of my application Serial No. 16,955, filed April 18, 1935.

One of the objects of my invention is to provide a camera structure having trigger means for effecting various control actions in an exposure of film.

Another object of my invention is to provide a camera structure having a case adapted to be grasped by the hand of the operator with a multiplicity of trigger members disposed in spaced positions in the case and operative by selective manipulation of the fingers of the operator for controlling the taking of either motion pictures or still pictures with the same camera.

Still another object of my invention is to provide a construction of camera adapted to be supported in the hand of the operator with coacting trigger members disposed in spaced positions in the camera casing and adapted to control the movement of the film for the taking of motion pictures or arrest the movement of the film for the taking of still pictures through the same optical system.

A further object of my invention is to provide a pre-settable control mechanism for a camera for governing the length of movement of a film coacting with a multiplicity of trigger members, one of which controls said mechanism for the taking of motion pictures and the other of which controls said mechanism for the taking of still pictures.

A still further object of my invention is to provide an interlocking mechanical member common to a pair of trigger operated systems in a camera whereby the trigger operated systems coact to selectively control the camera for the taking of motion pictures under one condition and for the taking of still pictures under another condition through the same optical system.

These and other objects will be apparent from the following, reference being had to the accompanying drawings in which like reference numerals designate corresponding parts and in which:

Fig. 1 is a sectional view of one embodiment of the cinematograph apparatus of my invention taken along the line 1—1 of Fig. 4;

Fig. 2 is a vertical sectional view taken along the line 2—2 of Fig. 1 with the lower front wall of the casing of the apparatus removed;

Fig. 3 is a rear elevation of the representation of Fig. 1, with a compartment closure member thereof in open position;

Fig. 4 is a transverse sectional view taken along the line 4—4 of Fig. 1;

Fig. 5 is a sectional view of a portion of the apparatus taken along the line 5—5 of Fig. 1;

Fig. 6 is a view of the cinematograph unit according to the invention in an operative position as used; and Fig. 7 is a view of a portion of the apparatus showing the operation of a mechanism for extracting a film magazine.

This invention contemplates the provision of a compact form of camera especially adapted for personal use, and formed in the shape of a gun for purposes of easy manipulation. According to the invention, the camera is magazine loaded and includes a pistol grip wherein is located the essential driving mechanism of the camera. A pair of trigger elements are disposed in positions in the pistol grip accessible to the fingers of the operator. A feature of the invention resides in a special film moving mechanism of compact construction for permitting the accommodation of the apparatus in a small enclosure comparable to gun size. Another feature resides in the provision of automatic control means for stopping the mechanism after predetermined exposure of the film.

Referring to the drawings in detail there is provided a substantially flat box-like container 1, the lower portion of which has an outer contour in the form of a pistol grip to fit the hand. The front wall 2 of the housing 1 has convolutions to fit the fingers while the rear wall 3 is provided with a reduced portion 4 to accommodate the thumb so that the hand of the user can easily grasp the casing. The precise formation of the casing can be better seen from Fig. 6, wherein the casing is shown in an operative position in the hand of the user. In the upper portion of the casing 1 there is provided a wall member 7 which is in the form of a projectile-shaped compartment for receiving the film magazine. In the nose portion of this magazine receiving compartment there is provided an aperture plate 8 for defining the picture area upon the sensitized film of the magazine.

A film-containing magazine is provided and is of a projectile form to fit within the magazine-receiving compartment. This magazine comprises two portions including a container 9 and lid 11 therefor, while within the container 9 are two rotatable reel elements 12 and 13. The reel element 13 has its spindle extending through the side wall of the container 9 and is provided with a rotatable element 14, as may be seen in Fig. 3, to engage with a rotatable take-up drive member mounted in the camera structure. It will of course be understood that the reel element 13 is provided with a suitable clutch arrangement, such as an intermediate spring drive, to permit of a proper take-up operation.

A film guide member 16 is mounted within the container 9 and has its outer surface formed to correspond with the inner contour of the container 9 to feed the film from reel element 12 to reel element 13 along the projectile-shaped nose of the magazine. An aperture opening 17 is provided in the container 9, as may be seen in Fig. 2, to receive the aperture plate 8. A resilient arrangement is provided as part of the guide members 16 to gently press the film 15 against the aperture plate system, when the magazine is in operative position within the magazine compartment. The sensitized film 15, initially stored upon the reel element 12 and fed to the tape-up reel element 13, is provided with but a single row of perforations to permit of a flatter and more compact construction of the camera and magazine.

The camera is accordingly provided with a special arrangement of perforation engaging means to impart the proper intermittent feed motion to the film in an exposure process. It will be noted in Fig. 2 that the magazine container 9 is provided with apertures 18 and 19, respectively, in alignment upon opposite sides of the aperture 17. These apertures are provided in flat portions of the container 9 which portions are disposed at substantially 90° with respect to each other, the portion of the container 9 immediately surrounding the aperture 17 being flat and disposed substantially 45° with respect to either of the surfaces bearing the apertures 18 and 19. The aperture 18 engages with the row of perforations of the film 15 to permit access to the film by a pilot pin 21 while the aperture 19 permits access to the perforations by a pull-down claw 22.

The pilot pin 21 is mounted upon a reciprocative member 23 having a pivot bearing 24. The member 23, on the other side of the pivot bearing 24, is provided with a yoke 25 within which a pin 27 is movable, as may be seen in Figs. 1 and 5. The pin 27 is mounted upon a yoke 28 which is slidably mounted, by suitable means, for movement in two directions. The pull-down claw 22 is carried by the yoke 28. The pull-down claw 22 is provided with a suitable resilient arrangement for permitting a rectilinear retraction with reference to the yoke 28. Such an arrangement is provided to permit facile insertion of the magazine and its film 15 and to insure the proper registration of the pull-down claw 22 with the perforations of the film 15 when the camera mechanism is set in motion. A shaft 29 carries a cam 30 which engages with the yoke 28 to impart reciprocative motion to the pin 22 in a direction at right angles to the surface of the film 15. This motion causes the pull-down claw 22 to be engaged and disengaged from the film. Another cam 31 is carried by the shaft 29 and engages parts connected with the yoke 28 to impart reciprocative motion to the pull-down claw 22 in a direction at right angles to the previously described moton to effect the linear movement of the film. It will be seen, therefore, that as the shaft 29 is rotated, the claw 22 is moved over a rectilinear course to impart an intermittent pull-down motion to the film 15 within the container 9.

This motion also effects the yoke 25 through pin 27 to oscillate the member 23 about the pivot 24 to cause the pilot pin 21 to engage with a perforation of the film 15 as the pull-down claw 22 is withdrawn from engagement with the film 15. The pilot pin 21 therefore holds the film 15 stationary for a picture exposure, while the pull-down claw 22 is moved into a position for a repeat pull-down operation. As the pull-down claw 22 engages the film, the pilot pin 21 is withdrawn to permit further linear movement of the film 15.

As shown in the drawing, a cylindrical shutter 34 is mounted on the member 23 in axial alignment with the pivot bearing 24 for reciprocative movement therewith. In a front extruded portion of the casing 1, a lens unit 35 is removably mounted by threaded engagement and forms an optical image through the aperture plate 8 upon the film 15. The cylindrical shutter 34 is provided with diametrically opposed openings, as may be ascertained from Fig. 5, for permitting the optical transmission of light to the film when the pilot pin 21 is in engagement with the film.

The shaft 29 is provided with a gear 38 which meshes with an intermediate driving gear 39. The intermediate driving gear 39 is driven by a main driving gear 40, which is provided with a coil or spiral spring 41 and the usual pawl and ratchet mechanism 42 for effecting the spring drive of the camera mechanism. The spring 41 is connected between the gear 40 and the shaft 43. The shaft 43 extends through the wall of the casing 1 and is provided with a handle to permit rotary driving forces to be imparted to the camera mechanism.

The gear 39 also drives a gear 45 which in turn drives a gear 46. Gear 46 engages the gear teeth of take-up drive means 47 which has a fin for engaging the element 14 on the magazine to impart rotary motion to the take-up reel element 13.

The gear 39 also engages with a gear 50 which drives a shaft upon which a stop-disc 51 is mounted. At a point near the periphery of the upper surface of the disc 51 a stop-projection 52 is provided. This projection 52 normally engages with a pin 53 depending from the lower side of a triangular plate member 54. The engagement of the stop-projection 52 by the stop-pin 53 prevents rotation of the disc 51 and consequently prevents movement of the entire movable mechanism of the camera. The gear ratio between the gears 38, 39 and 50 is such that the gears 50 and 38 rotate in synchronism so that the stopping of the disc 51 by engagement of the pin 53 with stop-projection 52 will always bring the perforation engaging means as well as the shutter 24 into a predetermined position with respect to the film. That is, the shutter will be in a position cutting off the light from a previously exposed portion of the film, while the pull-down claw 22 will be in a position ready for further movement of the film.

The plate member 54 is mounted upon a pivot bearing 56 which affords movement of the plate member 54 to move the pin 53 out of the path of the stop-projection 52 thereby permitting rotary movement of the disc 51. Another stop-projection 58 is provided on the disc 51 and is positioned slightly angularly removed from the stop-projection 52 and also slightly more towards the center of the disc within an arcuate path adjacent the arcuate path described by stop-projection 52. The projection 58 is wedge-shaped so that engagement of the pin 53 thereby exerts a slight force tending to move the pin 53 into position to engage the projection 52. It will be seen, therefore, that if the pin 53 is moved just sufficiently to be brought out of engagement with the pin 52, that the disc 51 will be permitted to rotate but one revolution inasmuch as the pin 53 will be engaged by the projection 58 during the angular movement of the disc 51. However, should the plate member 54 be moved so that the pin 53 is brought out of engagement with either of the projections 52 or 58, the disc 51 will be permitted uninterrupted rotation. If desired, a suitable speed governor mechanism, not shown, of conventional type may be coupled with the driving mechanism.

In accordance with the invention, a trigger member 60 is provided in the front central portion of the casing 1 and extends through a slot thereof to be normally accessible in the index finger depression of the pistol grip formation of the casing. This trigger member 60 is mounted for reciprocative movement within the casing 1 in a direction indicated by the arrow 61 and is provided with resilient means to cause the member 60 to normally assume a frontward position. In the lower front portion of the casing 1 another trigger member 63 is provided and extends through a slot in the casing 1 within the depression of the casing 1 formed to accommodate the little or fifth finger of the operator. The member 63 is also positioned for slidable or rectilinear movement in the direction indicated by the arrow 64 and is provided with resilient means to cause the member 63 to normally assume a frontward position.

The triangular plate 54 is provided with an upstanding pin 66 at one corner thereof, and at another corner thereof is provided with an upstanding pin 67. The depression of the trigger 60 by the index finger of the user imparts a rectilinear motion to the member 60 whereby a wedge-shaped portion thereof engaging the pin 66 imparts movement of the plate member 54 to bring the pin 53 out of the path of engagement of either the stop-projection 52 or the projection 58 whereby the disc 51 is permitted uninterrupted rotation to afford movement to the operable parts of the camera to effect the continuous feeding and exposure of the film in the taking of moving pictures. When the trigger 60 is released by the finger of the user, the associated resilient means cause the trigger member 60 to assume a frontward position and the spring 49 causes the triangular plate member 54 to return to a normal position whereby the pin 53 is engaged by the projection 52 and the moving mechanism of the camera brought to rest with the shutter 34 and perforation engaging means in a predetermined position.

When the user applies pressure to the trigger member 63, an angularly disposed edge thereof engages the pin 67 to move the plate member 54 in an upward direction so that the pin 53 is brought out of engagement with the stop-projection 52. The movement of the trigger member 63 is limited so that the pin 53 is only moved into alignment with the path of rotation of the projection 58. Therefore, when the pin 53 is thus moved, the disc 51 is permitted angular rotation equivalent to only one revolution. When the projection 58 engages with the pin 53 in its upper position, it is necessary to release the trigger member 63 in order to produce another or subsequent rotation of the disc 51 thereby. The trigger 63, in this action, effects the taking of a single "frame" of film. That is, the camera mechanism is moved through one cycle of its operation so that a single picture is taken upon the film 15. Such an arrangement is useful for various purposes when the user wishes to take single pictures.

In operating the camera to take either continuous movies or single "frame" pictures, the user grasps the camera as shown in Fig. 6. He may utilize either one of two techniques for selectively taking either type of picture. In one technique, he may have the index finger continuously over the trigger member 60, while at the same time holding the little or fifth finger over the trigger member 63, thus by selective pressure on these different fingers he may take either type of picture without any shift of the hand. Such a technique is desirable when the user desires to quickly shift from one type of picture to another. For example, a news photographer can utilize this technique for taking either movies or single "shots" of quickly moving and changing scenes and situations. On the other hand, another technique presents itself wherein the operator takes movies with his hand in a position such that the first or index finger is in position over the trigger 60 and the other fingers are positioned above the exposed portion of the trigger member 63 and not in contact therewith. In other words, to take continuous moving pictures, the camera grip is grasped in a "high" position. This position is specially shown in Fig. 6. To take single "shots" according to this latter technique, the operator then may shift his grasp of the camera from a "high" to a "low" position wherein the little or fifth finger engages the exposed portion of the trigger 63 while the first or index finger grasps a portion of the pistol-grip casing removed from the trigger member 60. Such a technique requires only a simple and slight movement of the hand to change from one condition to the other and is useful for the purposes such as amateur home moving pictures where the operator does not demand immediate alternative use of either operations. However, it will be seen that the camera is easily and effectively adaptable to meet the demands of various operating conditions in accordance with the scope of apparatus of this type.

A further feature of the invention is that a mechanical arrangement is provided so that the operation of the camera mechanism will be interrupted after a predetermined movement of the film. In other words, the camera can be manually set for an exposure process which will be interrupted at a predetermined time. This mechanical arrangement includes a train of gears comprising a pinion 70 driven by the gear 40 and which drives a gear 71. The gear 71 is mounted upon the hub of a rotatable member 72, mounted for rotation in an extruded depression in the cover portion of the casing 1, as may be seen in Fig. 4. This rotatable member 72 is provided with suitable indicia in the form of numbers for indicating the linear movement of the film 15. The driving gears are so proportioned that a predetermined movement of the gear 71 corresponds to a definite linear movement of the film 15 brought about by the perforation engaging means and the film take-up means. The member 72 is rotatably mounted upon a shaft 73 which is in turn rotatably mounted within the casing 1. The shaft 73 is provided, at its outward extremity, with a manually settable member 74 which serves as an index with reference to indicia on the member 72. A certain fit exists between the shaft 73 and the member 72 whereby the shaft 73 can be turned by the settable member 74 manually independently. However, driving motion imparted to the gear 72 will cause the rotation of the member 72 as well as shaft 73 to produce a film movement controlling operation.

To effect this operation, a cam member 75 is mounted on the shaft 73 for tripping a trigger arrangement. This trigger arrangement consists of a cam rider in the form of a lever 76 having a pivot 77. The trigger arrangement includes a latching mechanism in the form of another lever 78 having a pivot mounting 79. The pivot 79 is part of a shaft which extends externally of the casing to a manually settable element 85 adjacent the movable index member 72. A spring 88 is coiled about the shaft 79 to urge the lever 78 in a direction towards the lever 76. The lever 78 is provided with a pivoted dog 80 having one end resiliently urged into engagement with the inner curved surface of the lever 76 as shown. A notch is provided in the end of the dog 80 adapted to engage with a corresponding notch along the inner surface of the lever 76. The opposite end of the dog 80 is in the form of a cam which engages with an edge of the plate member 54. When the settable element 85 is turned in counter-clockwise direction, the cam portion of the lever 78 moves the plate member 54 into an upper position so that the pin 53 is moved out of engagement with either of the projections 52 or 58, thereby permitting the disc 51 to rotate and effect the operation of the moving parts of the camera to continuously record moving pictures upon the film 15. This counter-clockwise rotation of the manually settable element 85 and its pivot member 79 results in a sliding movement of the dog 80 along the inner surface of the lever 76. Resilient means including springs 82 and 83 cause the notches on the dog 80 and lever 76 to engage, whereby the lever 78 is latched in a position such that the plate member 54 is in an upward position permitting the taking of continuous moving pictures.

The cam member 75 will have been previously moved to a desired position to interrupt the operation of the camera in accordance with a predetermined movement of the film. After such predetermined movement of the film, the cam 75 will rotate its projecting portion into juxtaposition with the rider end of lever 76 whereby the lever 76 will be angularly moved about the pivot 77 to effect a trigger action release of the dog 80 so that the lever 78 and plate member 54 are resiliently returned to a normal position and the disc 51 brought to rest in its predetermined position. Upwardly extending pins 86 and 87 are provided on the lever 76 on the other side of the pivot 77 and in proximity to extending portions of the trigger members 63 and 60, respectively. Such an arrangement insures movement of the lever 76 to effect a trigger release of the latch arrangement including the dog 80 whenever either of the trigger members 60 or 63 is actuated. It will be seen, therefore, that movement of either one or both of the trigger members 60 or 63 supersedes the control of the film moving mechanism as determined by the settable element 85 and cam 75. It will be also noted that trigger members 60 and 63 each operate on the controlling magazine independently of each other so that the movement of one does not cause the movement of the other.

The compartment formed by the member 7 is made light-tight by a door 90 having a hinge 91 forming a pivot mounting upon the casing 1. The door 90 is held in closed position by a pin 92 which engages with a hole in a spring 93 mounted in the top wall of the compartment formed by member 7. This spring 93 serves another purpose in applying a downward pressure to the magazine container 9 to force the film into a proper recording position. A manually movable element 94 is pivoted to the door 90 and has an inwardly extending portion operating through a hole in the door 90 to depress the projecting end of the spring 93 sufficiently to permit the door 90 to be opened by angular movement about the hinge 91.

In accordance with my invention, a special mechanical arrangement is provided for permitting the convenient removal of the magazine from the compartment when the door is open, whereby the operator can quickly and easily grasp the magazine to permit of its instant withdrawal. In accordance with this arrangement, a flat elongated spring member 95 is secured to the inner portion of the door by the rivet 96. One end of the spring 95 is curled to form a finger 97 which engages with the complementary resilient catch member 98 mounted on the container 9. The other end of the spring 95 is provided with a slot through which a pin 99 extends from the door 90. This slot permits the free movement of one end of the spring 95 when the door 90 is in closed position so that the spring 95 resiliently presses against the rear end of container 9 to force the magazine into a proper frontward operative position. When the magazine has been manually inserted in the compartment 7, the door 90 may be swung about its hinge 91 to a closed position. In this closed position the end 97 of spring 95 will resiliently snap into engagement with the catch member 98 on the container 9. When it is desired to remove the magazine, the door 90 may be released by the member 94 and angularly moved about the hinge 91 whereupon the finger 97, in engagement with the catch 98, will rectilinearly partially withdraw the magazine from the magazine compartment.

Referring to Fig. 7, when the door 90 has angularly moved to the position shown, the finger 97 will resiliently slip out of engagement with the catch 98 and permit the door 90 to be moved into its lowered extreme position. The magazine will then have been partially ejected from the compartment so that the operator or user can easily grasp the same and effect its complete withdrawal. Conversely, when it is desired to insert the magazine, it is not necessary for the operator to push the magazine to its extreme forward position inasmuch as the mere closing of the door will effect the proper positioning of the magazine within the compartment.

In accordance with the invention the camera may be "sighted" in either of two ways. The camera may be directly pointed at the object without reference to the eye, in the same manner that a pistol is used in some instances, or a sighting telescope may be provided as shown in the drawing. Referring to Fig. 1, a telescope 100 having a suitable optical system is provided with a boss 101 which carries a pin 102. The pin 102 may be inserted in a suitable hole provided in the front end of the camera structure and a detent recess in the pin accommodates a spring 103, accessible from the inner side of the camera structure, to resiliently hold the pin 102 in a locked position. It will be seen therefore that the lens tube 100 may thus be positioned upon the upper surface of the camera. The lens tube is removable and it is constructed so that it may be carried in the vest pocket in the same manner as a fountain pen or pencil to permit the camera itself to be fitted into an extremely small space for carrying purposes, such as in the coat pocket or handbag.

The cinematograph apparatus of this invention provides a compact and small camera which can be conveniently and quickly utilized for taking moving pictures or still pictures under varying conditions. Although I have described a preferred embodiment of the apparatus, it will of course be understood that various changes can be made without departing from the scope of my invention. I do not, therefore, desire to limit myself except as may be pointed out in the appended claims.

What I claim as new and desire to secure by Letters Patent of the United States is:

1. A cinematograph apparatus comprising, a camera casing having a driving mechanism for moving a film in an exposure process, with a portion of said casing shaped to be grasped in the hand of the operator and notched along one side to accommodate the fingers of the hand of the operator and means driven concomitantly with the movement of said film including reduction gears for automatically interrupting the movement of said film at a predetermined time, and a plurality of finger actuated trigger elements disposed in spaced positions in said casing for controlling said mechanism and superseding the control by said last mentioned means, each of said trigger elements being independently operative by the fingers of the hand of the operator while grasping said casing.

2. A cinematograph apparatus comprising a casing having an optical system therein with a portion of said casing shaped to be grasped in the hand of the operator, film advancing mechanism carried by said casing, said casing including a finger grip structure notched along one side to accommodate the fingers of the hand of the operator and having one trigger for controlling said film advancing mechanism and another trigger for interrupting the effectiveness of said film advancing mechanism and controlling timed exposure of said film in still position, and a motor substantially enclosed by said grip structure for actuating said film advancing mechanism.

3. A camera comprising, a casing carrying film exposure mechanism and having exterior coacting finger receiving notches conforming with the fingers of an operator's hand in which said casing is grasped, and trigger control mechanism connected with said exposure mechanism and having spacially related different trigger parts extending adjacent different parts of said convolutions of said casing to permit the operator to control said mechanism in different senses with the fingers of the hand that supports said casing in engagement with said convolutions.

4. A camera including a casing having a magazine chamber structure, an optical system, a finger-grip casing structure extending from said magazine chamber structure notched along one side to accommodate the fingers of the hand of the operator and, motor driven film exposing mechanism for exposing a magazine-contained film in said chamber and having parts thereof housed in said finger grip structure and extending through said finger grip structure to permit the hand of an operator engaging said finger grip structure to control the operation of said motor driven mechanism while focusing the camera upon a subject, said finger grip structure including a pair of trigger members selectively operative in coaction with each other to render said motor driven film exposing mechanism operative under one condition and arresting the operation thereof under another condition while exposing said film through said optical system for recording a still picture.

5. In a camera including an optical system, film exposing mechanism, a motor mechanism for driving said film, a casing having a grip structure notched in a multiplicity of positions along one side of said casing for accommodating the hand of an operator to support and direct the camera, and a plurality of spacially related trigger elements positioned at different parts of said grip structure subject to actuation by different fingers of the operator's hand while engaging said grip structure in the support of said camera, said elements being effectively connected with said mechanism to cause the operation of the same under one condition for effecting an exposure of the film in arrested position through said optical system and under another condition for exposing said film through said optical system while said film is driven by said motor mechanism.

6. A camera comprising, an optical system, a film advancing mechanism, control means for controlling the operation of said mechanism, a pre-settable mechanism for operating said control means to stop said mechanism after a predetermined movement of film, a "still picture" trigger member adapted to disable said pre-settable mechanism and concomitantly operate said control device to take a limited exposure through said optical system, and a "motion picture" trigger member also adapted to disable said pre-settable mechanism and concomitantly operate said control device to permit the continuous operation of said film advancing mechanism for effecting an exposure through said optical system.

7. A camera in accordance with claim 6 in which said "motion picture" trigger includes a mechanical member engageable with said "still picture trigger" to take the control of said control device away from said "still picture" trigger and away from said pre-settable mechanism.

8. A camera having film advancing mechanism, a "still picture" trigger-operated mechanical system for controlling said mechanism to take still pictures in accordance with the operator's depression of the trigger, and a "motion picture" trigger-operated mechanical system for controlling said mechanism to take continuous moving pictures, and an interlocking mechanical member common to each of said trigger-operated systems engageable with the "motion picture" trigger, when operated, to effect master control of the film advancing mechanism to the exclusion of the "still picture" trigger.

GORDON BROWN SCHEIBELL.